United States Patent [19]
Ebbenga

[11] Patent Number: 5,860,485
[45] Date of Patent: Jan. 19, 1999

[54] GROCERY CART MOVER

[75] Inventor: Mark A. Ebbenga, Forest Lake, Minn.

[73] Assignee: Rhino Craft, Inc., Forest Lake, Minn.

[21] Appl. No.: 864,148

[22] Filed: May 28, 1997

Related U.S. Application Data

[60] Provisional application No. 60/018,419 May 28, 1996.

[51] Int. Cl.$^6$ ................................................. B62D 51/04
[52] U.S. Cl. .................. 180/19.2; 180/65.1; 280/33.991; 414/469
[58] Field of Search .................................. 180/19.1, 19.2, 180/19.3, 65.1, 211, 264, 332, 333, 334, 904; 280/33.991, 33.992, 33.998, DIG. 4, 47.11; 414/469

[56] References Cited

U.S. PATENT DOCUMENTS

| | | | |
|---|---|---|---|
| 2,512,565 | 6/1950 | Hallander | 188/171 |
| 2,623,760 | 12/1952 | Fornelius | 230/179 |
| 2,879,858 | 3/1959 | Thomas | 180/19 |
| 3,524,512 | 8/1970 | Voeks et al. | 180/14 |
| 3,575,250 | 4/1971 | Dykes | 180/11 |
| 4,063,612 | 12/1977 | Weiss | 180/195 |
| 4,094,372 | 6/1978 | Notter | 180/1 G |
| 4,289,212 | 9/1981 | Immel | 180/19.1 |
| 5,082,074 | 1/1992 | Fischer | 180/11 |
| 5,322,306 | 6/1994 | Coleman | 280/33.992 |

FOREIGN PATENT DOCUMENTS

| | | | |
|---|---|---|---|
| 203-834-A | 12/1986 | European Pat. Off. | |
| 1106549 | 12/1955 | France . | |
| 1753804 | 7/1973 | Germany | 280/33.991 |
| 2350 308 A1 | 4/1975 | Germany . | |
| 2450692 | 4/1976 | Germany | 180/19.2 |
| 3724-201-A | 2/1989 | Germany . | |
| 1259594 | 1/1972 | United Kingdom | 180/19.2 |
| WO 90/11922 | 10/1990 | WIPO . | |

*Primary Examiner*—Anne Marie Boehler
*Attorney, Agent, or Firm*—Kinney & Lange, P.A.

[57] ABSTRACT

A powered grocery cart mover moves a line of grocery carts. The grocery cart mover includes a drive mechanism and a mechanism for engaging the line of grocery carts. The engaging mechanism is configured and arranged so that upon activation of the drive mechanism, the engaging mechanism lifts an end of the line of carts off the ground and moves the carts horizontally in a desired direction. The drive mechanism is pivotally connected to the cart engaging mechanism to facilitate steering of the cart engaging mechanism and the line of carts. The grocery cart mover can further include a harnessing mechanism releasably attachable to the cart engager and the line of carts for securing the line of carts relative to the cart engager.

20 Claims, 5 Drawing Sheets

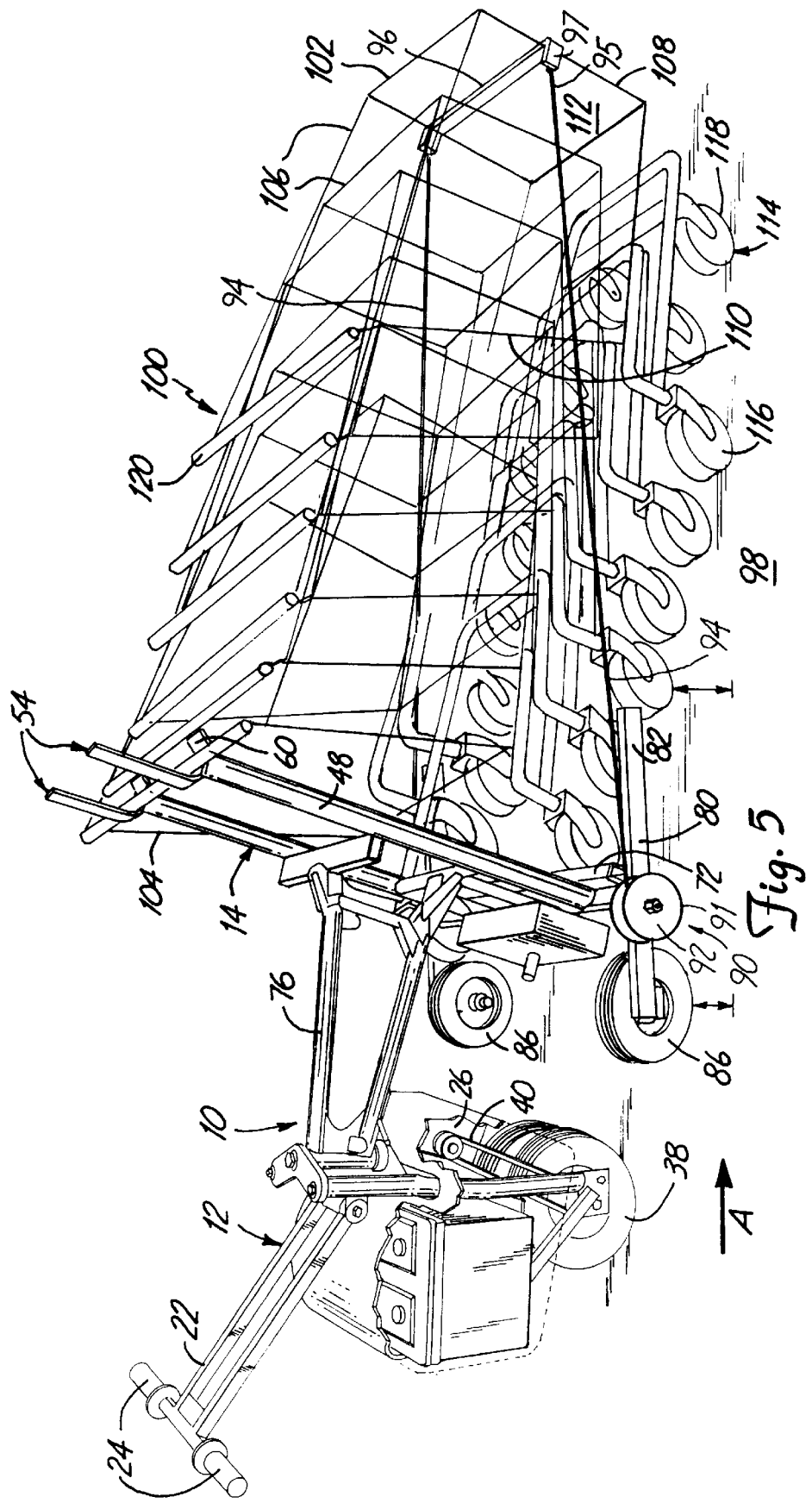

GROCERY CART MOVER

REFERENCE TO RELATED APPLICATIONS

This application is a continuation of U.S. Provisional Application No. 60/018,419.

FIELD OF THE INVENTION

This invention relates to devices for moving objects and in particular relates to a device for moving a line of grocery carts.

BACKGROUND OF THE INVENTION

A significant degree of grocery shopping occurs in large supermarkets. These supermarkets frequently are primarily self-service supermarkets in which the customer uses a grocery cart made available at the store to collect groceries for presentation at a checkout counter. The customer then typically bags their own groceries and places the groceries in the grocery cart for transport to their vehicle located outside the store. After the customer unloads the groceries from their cart into their vehicle, the grocery cart is returned by the customer to one of several corrals located in the store parking lot. Periodically, an employee of the store will gather grocery carts from the corrals located in the parking lot and return the grocery carts to a location inside the store for use by customers entering the store.

The grocery carts are usually made so that the carts can be temporarily joined together by pushing the front end of a first grocery cart into the rear end of a second grocery cart. The rear end of the second grocery cart collapses in a manner allowing the front end of the first grocery cart to mate with the interior of the basket portion of the second grocery cart. An unlimited number of grocery carts can be joined together in this manner, subject only to practical size and space limitations.

When returning the carts to the store, a store employee gathers the multiple grocery carts by joining the carts together using this temporary mating process until a line of carts including anywhere from five to twenty or so carts has been formed. Next, the employee typically secures a rope to the front end of a cart at the front of the line of carts. This rope extends along the line of carts to the rear of the line of carts whereupon the employee may temporarily fasten the rope to the rear cart or retain the end of the rope in the employee's hand. This rope helps to maintain the line of carts together to facilitate maneuvering the line of carts.

Once the carts are temporarily joined together, the employee maneuvers the line of carts by pushing the handle of a cart at the rear of the line of carts to advance the line of carts forward toward the store or desired location. In order to steer the line of carts, the employee must move the rear of the line of carts laterally in a direction perpendicular to the general direction in which the line of carts is being advanced. Lateral movement of the rear cart to steer the line of carts is facilitated by lifting the rear cart so that the wheels of the rear cart are off the ground.

However, due to the weight and bulk of the line of grocery carts, this maneuvering process is difficult, time consuming, and can be injurious. Store employees can frequently be seen using their whole bodies to jerk a line of grocery carts into a desired orientation. The situation is aggravated by adverse weather conditions such as snow or ice on the parking lot surface over which the carts must be moved. The ice or snow can result in the store employee slipping while attempting to move the heavy line of carts as well as the snow or ice forming an obstruction to pushing the line of carts forward in the desired direction, or to moving the rear of the line of carts laterally to steer the line of carts.

Injuries associated with moving lines of grocery carts in these scenarios can include wrist injuries, strained back muscles, as well as injuries associated with slipping and falling. These injuries can result in worker compensation claims as well as other claims against the store resulting from those injuries.

Examples of attempts to address this problem include: (1) using a hand push pallet truck with a grocery cart mounted on the truck for engaging a line of carts; and (2) using a powered vehicle on which an employee can sit to engage a line of carts. In this latter example, a second employee assists in guiding the line of carts.

SUMMARY OF THE INVENTION

The present invention comprises a grocery cart mover for moving a line of grocery carts. The grocery cart mover comprises a drive mechanism and a cart engaging mechanism for engaging the line of grocery carts. The engaging mechanism is configured and arranged so that upon activation of the drive mechanism, the engaging mechanism lifts an end of the line of carts off the ground and moves the carts horizontally in a selected direction. The drive mechanism is preferably pivotally connected to the cart engaging mechanism to facilitate steering of the cart engaging mechanism and the line of carts. The grocery cart mover preferably further comprises a harnessing mechanism that is releasably attachable to the cart engager and the line of carts for securing the line of carts relative to the cart engager.

The cart engager includes a generally vertical portion configured and arranged so that upon activation of the drive mechanism the vertical portion lifts the end of the line of carts off the ground and pushes the line of carts horizontally in a desired direction. The cart engager also preferably includes a generally horizontal portion that forms an acute angle relative to the vertical portion such that the generally vertical portion inclines toward the end of the line of carts to facilitate lifting the end of the line of carts off the ground and pushing the line of carts horizontally in a selected direction. In particular, the vertical portion include a mechanism for releasably supporting an upper handle of an end of a grocery cart to lift and push the end cart of the line of carts off the ground.

The grocery cart mover of the present invention can be used in a method of moving a line of grocery carts. First, a line of grocery carts which are releasably connected in the series are provided. An engaging mechanism is manipulated to engage a first end of the line of grocery carts. A drive mechanism, which is pivotally connected to the engaging mechanism, is activated to push the line of carts in a generally horizontal plane wherein the configuration of the engaging mechanism causes the first end of the line of grocery carts to lift off the ground and to push the line of carts horizontally in a desired direction. The line of carts is selectively steered by rotating the drive mechanism relative to the engaging mechanism so that the drive mechansim articulates relative to the engaging mechanism. The method further comprises fastening the line of carts to the engaging mechanism to facilitate maneuvering the carts.

BRIEF DESCRIPTION OF THE DRAWINGS

FIG. 5 is a perspective view of a grocery cart mover of the present invention engaging a line of grocery carts.

DETAILED DESCRIPTION OF THE PREFERRED EMBODIMENTS

Figure 1:
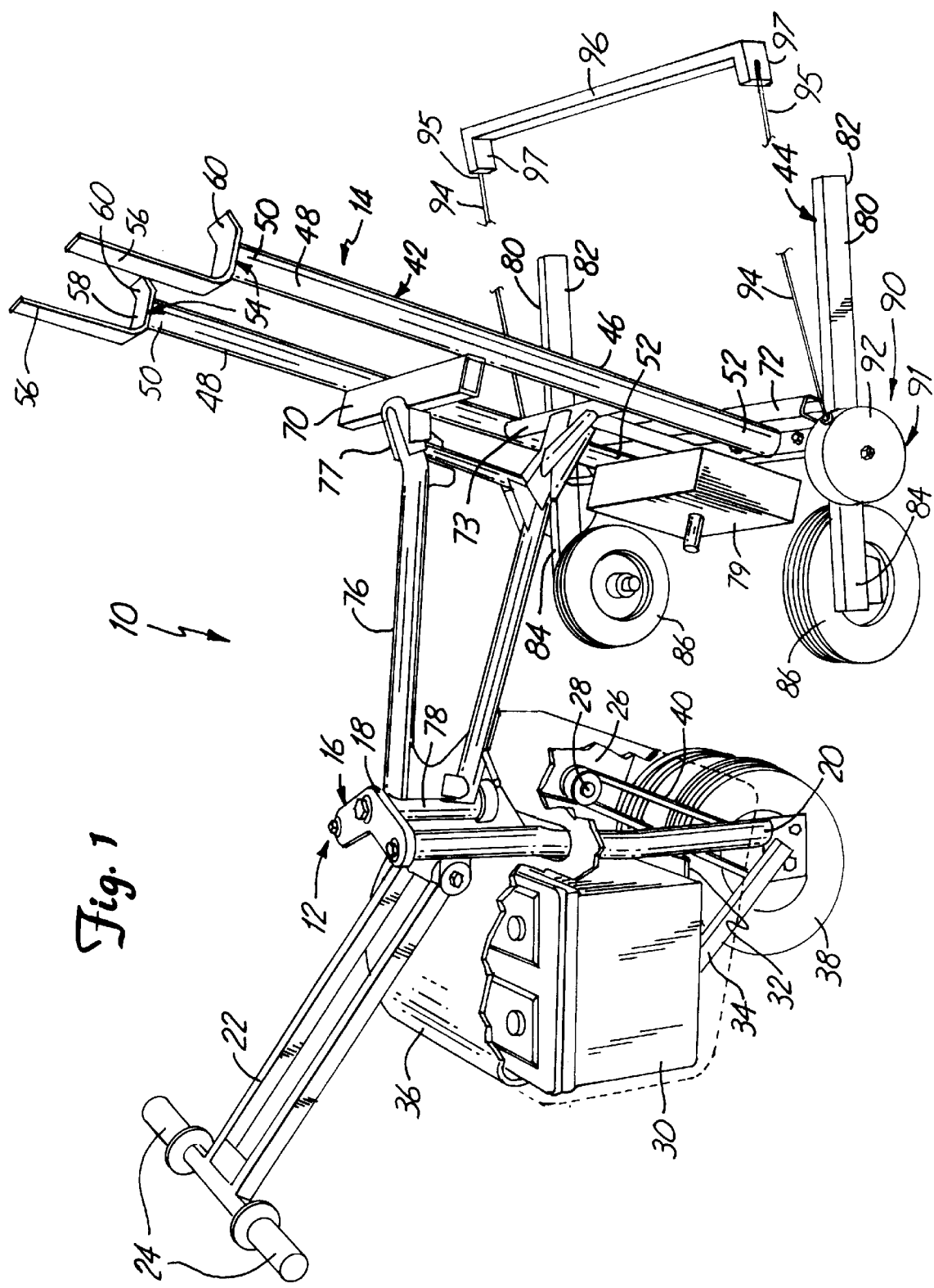
FIG. 1 is a perspective view of a grocery cart mover of the present invention.

A grocery cart mover of the present invention is illustrated generally in FIG. 1 at 10. The grocer cart mover 10 includes a drive mechanism 12 and a cart engager 14. The drive mechanism 12 includes a frame 16 having an upper portion 18, a lower portion 20, and a handle 22 with a throttle hand control 24. The drive mechanism 12 also includes a gear motor 26, a drive gear 28, a power supply 30, a platform support 32, and a support arm 34. The drive mechanism 12 further includes a housing 36, a pair of wheels 38, and a drive belt 40.

The cart engager 14 includes a vertical portion 42 and a horizontal portion 44. The vertical portion 42 includes a central frame 46 having a pair of vertical posts 48. Each vertical post 48 includes an upper end 50, a lower end 52, and an L-shaped fork 54. The fork 54 includes a vertical portion 56, a horizontal portion 58, and a lip 60. The central frame 46 of vertical portion 42 also includes an upper support member 70, a lower support member 72, and an intermediate support member 73. The vertical portion 42 of cart engager 14 also includes a mid body extension 76 having a vertical support 78 and an optional weight 79.

The horizontal portion 44 of the cart engager 14 includes a pair of side arms 80, each having a first end 82, a second end 84, and a wheel 86.

The drive mechanism 12 is supported by the pair of wheels 38 which are rotatably mounted on lower frame portion 20. The wheels 38 are of a low pressure-type known to those skilled in the art and include tires especially made for contact with snow and/or ice to facilitate gripping of the wheels 38 on slick surfaces. The wheels 38 including tires are of a design suitable to support a substantial amount of weight, for example, about 300 pounds.

The platform support 32 of the drive mechanism 12 extends laterally from the lower portion 20 of frame 16 to support the power supply 30 thereon. The support arm 34 is connected between an outer portion of the support platform 32 and an end of lower frame portion 20 to support platform 32. The power supply 30 as shown in FIG. 1 is located on a side of the drive mechanism frame 16 opposite the cart engager 14. The configuration of central frame 16 and support member 32 can be arranged to position the heavy weight power supply 30 on the side of the central frame 16 opposite that shown in FIG. 1 or in a position substantially central with a longitudinal axis of central frame 16. Placing the power supply 30 in these alternative positions can achieve a desired weight distribution of the drive mechanism 12 relative to the cart engager 14. The power supply 30 is preferably a 12 volt wet cell battery.

The gear motor 26 is mounted on the lower frame portion 20. The gear motor 26 shown in FIG. I comprises a combined motor and gear reduction box system. While many motors known to those skilled in the art may be suitable, the motor can include a Model Series 650 DC variable speed gear motor obtainable from Bison Gear And Engineering Corporation of Downers Grove, Ill. The motor preferably is a one-half horse power motor including a gear reduction box providing a gear ratio of 39:1.

The drive belt 40 is disposed about drive gear 28 of gear motor 26 and extends downwardly adjacent lower frame portion 20 to be disposed about a gear (not shown) associated with the pair of wheels 38. Belt 40 is a conventional drive belt including teeth for engaging drive gear 28 and the gear associated with the pair of wheels 38. A chain can be used in place of the drive belt 40.

The housing 36 is formed of a molded plastic configured to enclose the platform support 32, power supply 30, gear motor 26, drive gear 28, and belt 40.

The handle 22 of the drive mechanism 12 is connected to and extends from an upper portion 18 of frame 16. The handle 22 extends generally at an angle of about 45° relative to the vertically aligned frame 16. The hand controls 24 and handle 22 are operatively connected by wires through handle 22 to gear motor 26. The throttle hand controls 24 are configured so that upon manipulation, gear motor 26 is activated to drive the belt 40 and thereby drive the wheels 38. Upon release of hand controls 24, the hand controls 24 return to a home position in which the gear motor 26 is not activated, thereby eliminating driving power to the wheels 38.

The vertical portion 42 of cart engager 14 consists primarily of the central frame 46. The lower end 52 of each vertical post 48 of central frame 46 is secured to the lower support member 72. The vertical posts 48 are spaced from each other horizontally and are fixed on the lower support member 72 to form an incline relative to a horizontal plane, thereby yielding an acute angle between the vertical posts 48 and the horizontal portion 44 of about 70 degrees. The central frame 46 is further constructed by upper support member 70 and intermediate support member 73 which extend between and are connected to the pair of posts 48. The vertical posts 48 are oriented so that the fork 54 at the upper end 50 of post 48 is oriented with the open portion of the fork 54 facing a direction opposite the drive mechanism 12. The vertical posts are of a length suitable for the fork to engage a handle of a grocery cart.

The mid body extension 76 of cart engager 14 extends from the upper support member 70 and the intermediate support member 73 to the drive mechanism frame 16. The mid body extension 76 can be a single elongate member or a pair of elongate members as shown in FIG. 1. The vertical support 78 forms the end of mid body extension 76 and includes a ball bearing system for permitting pivotal connection to the upper frame portion 18 of drive mechanism 12.

The side arms 80 of the horizontal portion 44 of the cart engager 14 are releasably connected to the vertical portion 42. In particular, the side arms 80 engage lower support member 72 adjacent a mid portion of side arm 80 between ends 82 and 84. Each of the wheels 86 is rotatably mounted on the second end 84 of each side arm 80. The wheels 86 are mounted at end 84 to be positioned between the vertical portion 42 of cart engager 14 and the drive mechanism 12, being located generally under mid body extension 76. In the absence of any load on the cart engager 14, both the pair of wheels 86 of the cart engager 14 and the wheels 38 of the drive mechanism movably support the cart mover 10.

The materials used for constructing drive mechanism 12 and cart engager 14 include a high strength hollow construction made of steel or a suitable alloy. The individual parts may be either bolted together or welded together as is well known in the art. For example, the lower ends 52 of each vertical post 48 are welded to the lower support member 72 whereas side arms 80 are fixed to the lower support member 72 by a bolt.

The cart engager 14 also includes the weight 79 which may be optionally attached to the cart engager 14 to act as a counter weight to the power supply 30. However, if the power supply 30 is positioned as in one of the alternative arrangements previously discussed, the optional weight 79 may be omitted from the cart engager 14.

The cart engager 14 can further include a harness sytem 90 as can be seen in FIG. 1. The harness system 90 includes a pair of spools 91 mounted on the side arms 80 adjacent wheels 86 on opposite sides of the central frame 46. The spools 91 each include a housing 92 and a line 94 such as a rope or cable wound inside the spool housing 92. Each rope or cable 94 has a free end 95. The spool 91 is of a type that permits the line 94 to be selectively pulled out of the spool housing 92 by an external force yet is biased to retract line 94 inside the housing 92 when an external force holding the line 94 releases the line 94. The harness system 90 also includes an elongate bar 96 sized and shaped to releasably mate with a front end of a grocery cart (not shown). Each end 97 of the bar is connected to one of the ends 95 of the lines 94.

Figure 2:
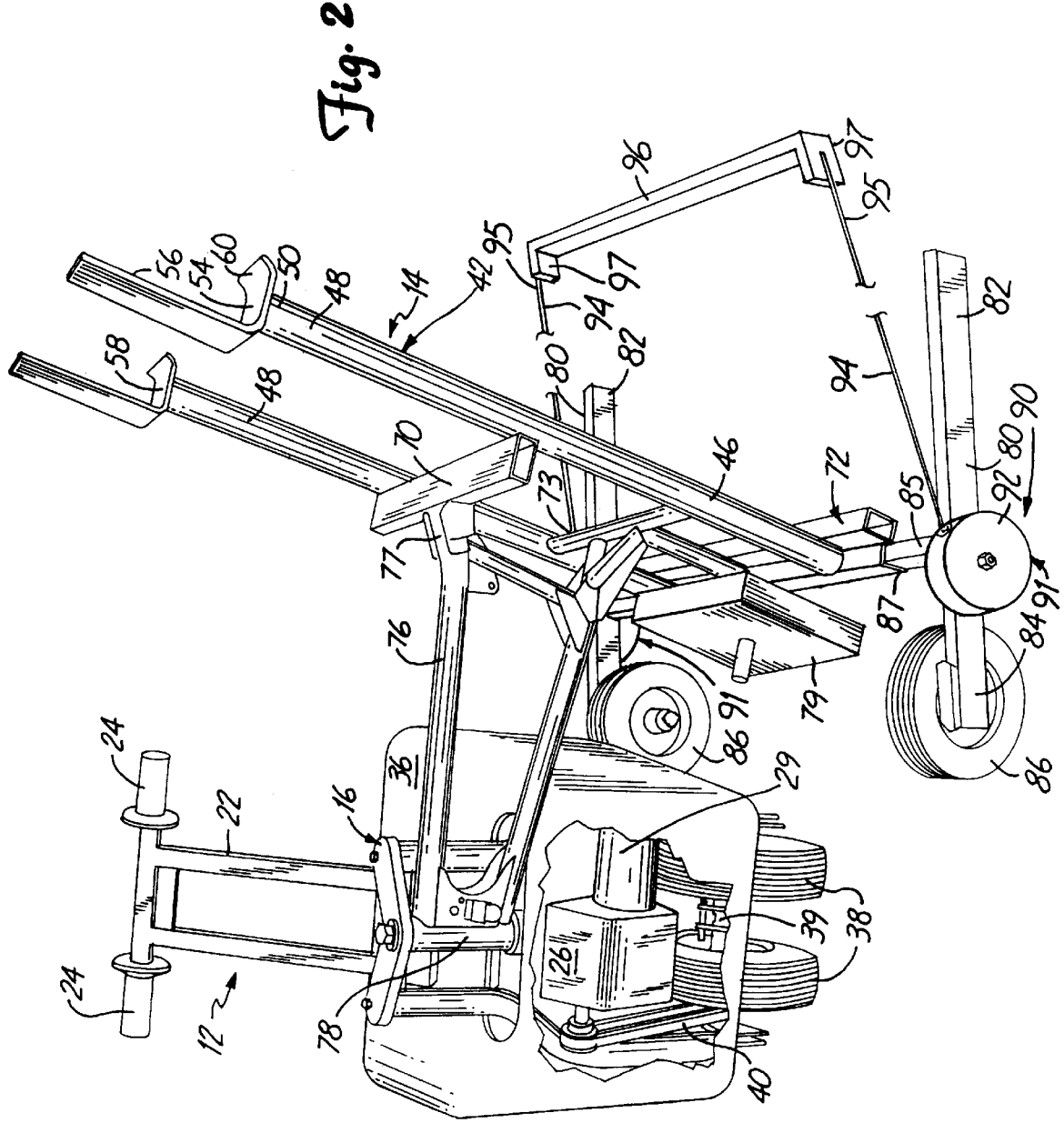
FIG. 2 is a perspective view of a drive mechanism articulated relative to a cart engager of the grocery cart mover of the present invention.

As shown in FIG. 2, the gear motor 26 of drive mechanism 12 includes a gear reduction box 27 and a motor portion 29. The motor portion 29 is electrically connected to the power supply 30 and the throttle hand controls 24. The gear box 27 is mechanically connected via drive gear 28 to belt 40 to provide driving power to the pair of wheels 38. As can be seen in FIG. 2, the pair of wheels 38 are connected by an axle 39 allowing rotation of the wheels 38.

FIG. 2 further illustrates articulation of the drive mechanism 12 relative to the cart engager 14 by means of the pivotal mounting of end 78 of mid body extension 76 relative to the upper frame portion 20 of drive mechanism 12. Bearings mounted within end 78 of the mid body extension 76 permit quick and easy rotation of the drive mechansim 12 relative to the cart engager 14. The mid body extension 76 being pivotally attached to the drive mechanism 12 permits the drive mechanism 12 to articulate so that the drive mechanism 12 can be oriented at an angle of at least 90 degrees relative to the mid body extension 76, as shown in FIG. 2. Allowing the drive mechanism 12 to articulate at such a large angle relative to the mid body extension 76 and cart engager 14, greatly facilitates steering the cart engager 14.

FIG. 2 also further illustrates the relationship of side arm 80 to lower support member 72. In particular, side arm 80 includes an extension 85 which is sized and adapted for slidable movement within a sleeve 87 of lower support 72.

Figure 3:
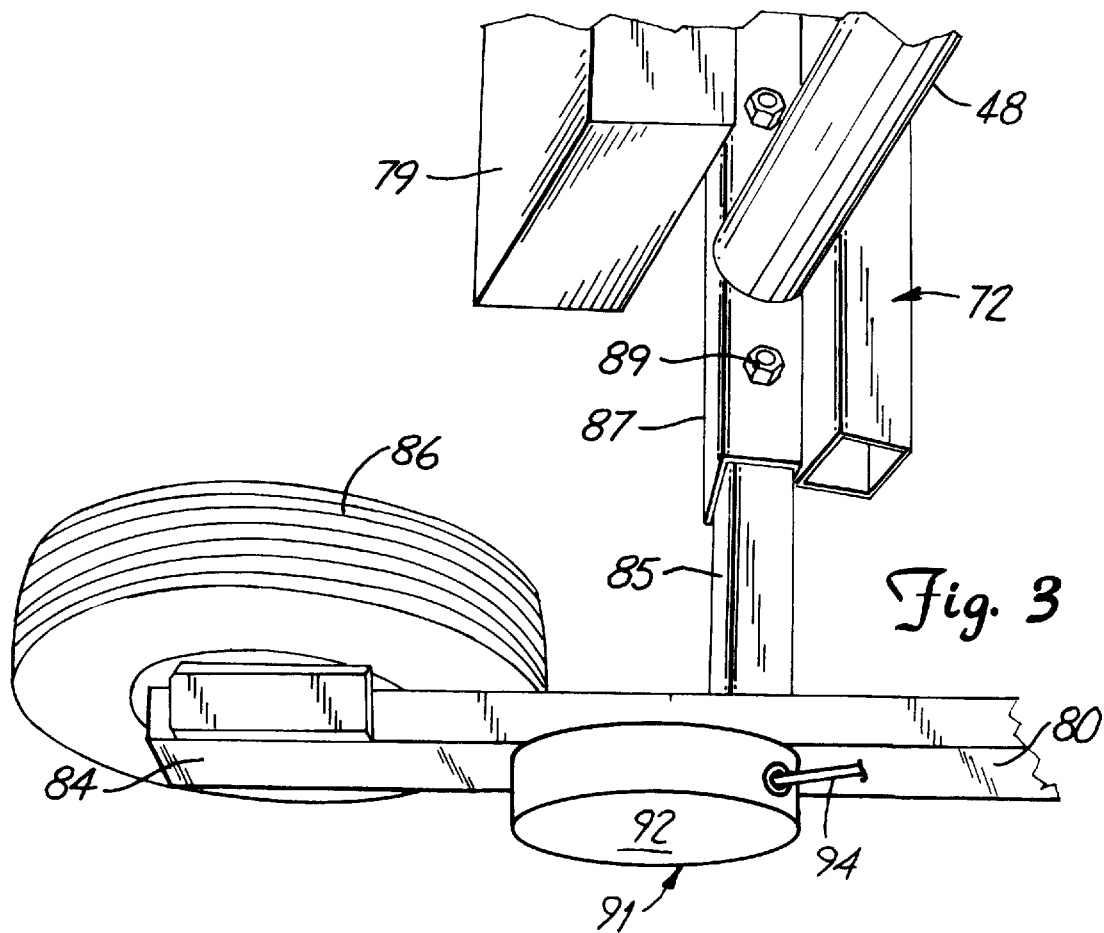
FIG. 3 is an enlarged perspective view of a lower portion of a cart engager of the grocery cart mover of the present invention.

FIG. 3 provides a further illustration of the interaction of side arm 80 and lower support member 72. In particular, extension 85 of side arm 80 slidably moves within and relative to the sleeve 87 of lower support member 72. In addition, the extension 85 is selectively fixed within sleeve 87 of the lower support member 72 by use of a fastener 89 which cooperates with the extension 85 to fix the side arm 80 relative to the sleeve 87 of support member 73. Since each side arm 80 is selectively positioned relative to the central frame 46 via the relationship of extension 85 and support sleeve 87, the side arms 80 is selectively positioned to match the width of a cart or object to be engaged by the cart engager 14.

Figure 4:
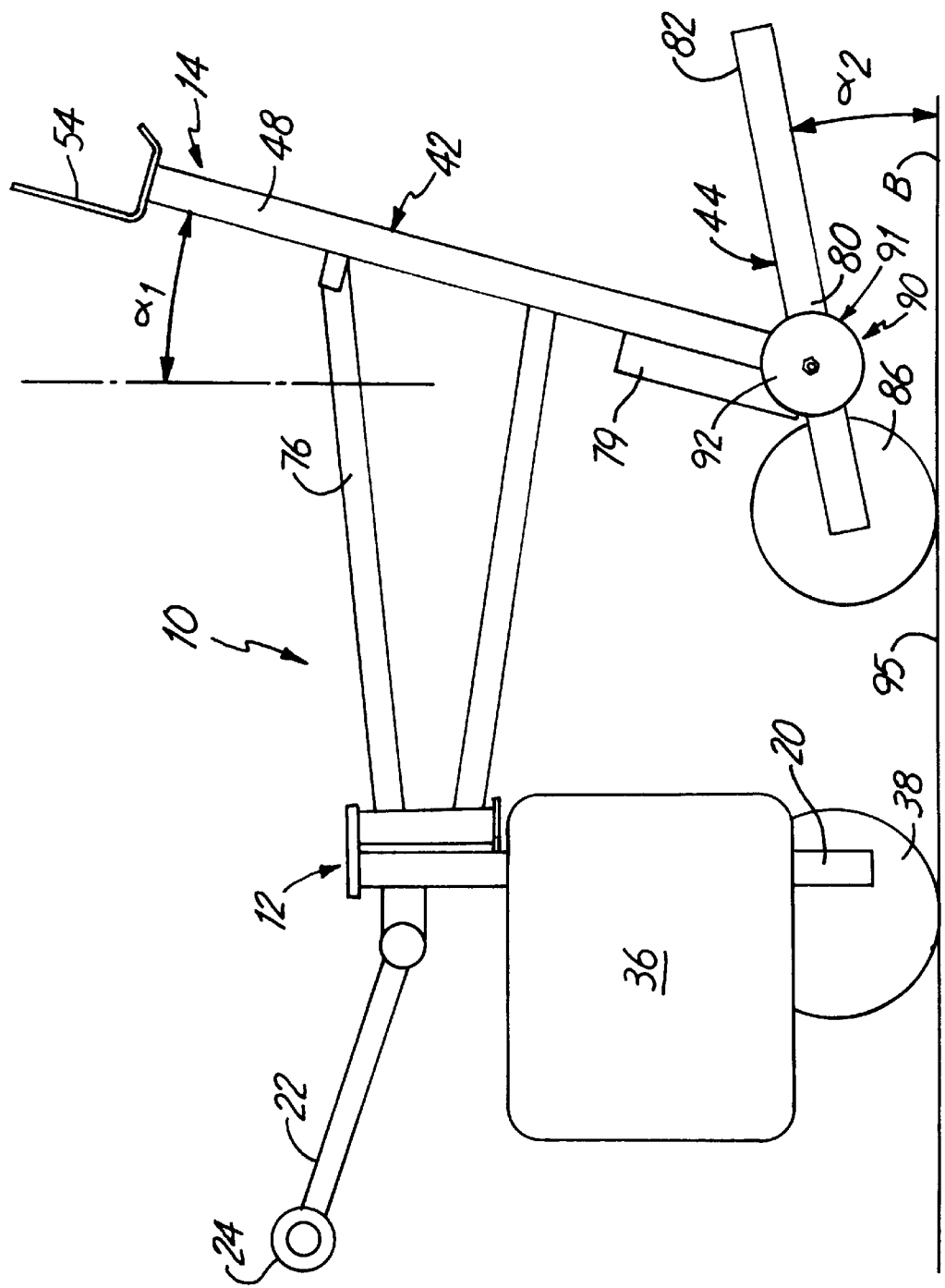
FIG. 4 is a schematic plan view of the grocery cart mover of the present invention.

As shown in FIG. 4, when both wheels 38 of the drive mechanism 12 and the wheels 86 of the cart engager 14 are on a ground surface 98, the vertical posts 48 of vertical portion 42 form an angle $\alpha_1$ of about 10° relative to a vertical plane (A) while the side arms 80 of horizontal portion 44 form an angle $\alpha_2$ of about 10° relative to a horizontal plane (B), i.e., the ground surface 98. The incline of vertical portion 42 relative to the horizontal portion 44 forms an acute angle of about 70°.

As shown in FIG. 5, the grocery cart mover 10 is adapted to engage a line of grocery carts 100. The line of grocery carts 100 includes a front end 102 and a rear end 104. The line of grocery carts 100 is comprised of a series of grocery carts 106 releasably interconnected in series. Each grocery cart 106 includes a front end 108 and a rear end 110 as well as a basket 112 and a wheel assembly 114 including rear wheels 116 and front wheels 118. The grocery carts 106 are mated relative to each other by aligning a front end 108 of a first grocery cart 106 with the rear end 110 of a second grocery cart 106 and advancing the front end 108 of the first grocery cart into the rear end 110 of the second grocery cart so that the baskets 112 of the respective grocery carts mate with each other. In this fashion, several grocery carts can be interconnected in series as shown in FIG. 5 forming the line of grocery carts 100 adapted to be moved in unison.

In use, the cart engager 14 of the grocery cart mover 10 is positioned adjacent a grocery cart 106 at the rear end 104 of the line 100. The cart engager 14 is aligned so that the side arms 80 are located just outside the rear wheels 116 of at least one rear cart 106 to prevent side to side motion of the rear end 104 of the line of carts 100. In addition, the forks 54 of the vertical posts 48 are positioned adjacent a handle 120 of the rear grocery cart 106 of the line of carts 100. Prior to engaging the line of grocery carts 100, all four wheels of grocery cart mover 10 including the pair of wheels 38 and the pair of wheels 86 are in contact with the ground surface 98. In addition, while the cart engager 14 is in this position, the bar 96 of harnessing system 90 is pulled away from the spools 91 on the cart engager 14 (the spools 91 permitting release of lines 94) until the bar 96 is positioned on a cart 106 at the front end 102 of the line of carts 100 as shown in FIG. 5. With the bar 96 temporarily mounted on the front end 102 of the line of carts 100 and the bias of spool 91 tending to pull the lines 94 and the bar 96 toward the cart engager 14, the harness system 90 tends to hold the carts 106 together and against the cart engager 14 to facilitate maneuvering the line of carts 100.

With the cart engager 14 aligned with the rear end 104 of the line of grocery carts 100 and with the harness system encompassing the line of carts 100, the drive mechanism 12 is activated by hand controls 24 causing drive wheels 38 to move the drive mechanism 12 and cart engager 14 into contact with the rear end 104 of the line of carts 100. As the cart mover 10 moves into the rear end 104 of the line of carts 100, the forks 54 of the vertical posts 48 slip under the handle 120 of the rear cart 106 so that the handle 120 lodges firmly in the fork 54 against fork vertical portion 56 and behind the lip 60. Simultaneously, as the cart engager 14 continues to advance in a forwardly direction as indicated by arrow A, the cart engager 14 pushes the rear cart 106 into and against the other carts in the line of grocery carts 100 causing the carts to forcibly engage each other thereby eliminating excess horizontal spacing between the respective grocery carts 106. The spools 91 of harness system 90 take up additional length of line 94 as spacing between the carts 106 is eliminated.

Next, as the drive mechanism 12 continues to move horizontally, further pressing the cart engager 14 against the line of carts 100, the inclined vertical posts 48 translate this horizontal force upward at an angle so that the cart engager 14 pushes handle 120 of rear cart 106 upward thereby lifting the rear wheels 116 off the ground surface 98. At the same time that the rear cart 106 is being lifted off the ground surface 98, the wheels 86 of the cart engager 14 also lift off the ground surface 98 with the rear cart 106 as shown in FIG. 5. As the drive mechanism 12 continues to move, this lifting process continues causing multiple carts 106 adjacent the rear end 104 of the line of carts to be lifted off the ground surface 98 until excess vertical spacing no longer remains between the baskets 112 of the respective carts adjacent rear end 104. At this point, the entire weight of the line of carts 100 prevents the cart mover 10 from lifting any more carts off the ground. Accordingly, with the rear end 104 of the line of carts 100 and the wheels 86 of cart engager 14 lifted off the ground as shown in FIG. 5, the drive mechanism 12 and cart engager 14 push the line of carts 100 forward along in a fowardly direction as indicated by arrow A to a selected location. The speed of moving the line of carts 100 can be controlled via throttle hand controls 24. Release of the throttle 24 causes the cart mover 10 to stop since power is no longer supplied to gear motor 26.

As the line of carts 100 advances forward, the operator has the ability to cause the line of carts 100 to advance in a selected direction by steering the drive mechanism 12 in a desired orientation relative to the cart engager 14 (and the line of carts 100). The side arms 80 of cart engager 14 extend alongside the wheel assembly 114 and basket 112 of carts 106 at the rear end 104 of the line of carts 100 to facilitate steering the line of carts 100. The spacing between the side arms 80 is selectively fixed so that the side arms 80 are closely adjacent the carts 106. Accordingly, when the drive mechanism 12 and cart engager 14 are manipulated to steer the line of carts 100, the side arms 80 ensure that the rear end 104 of line 100 remains secured against cart engager 14, particularly between side arms 80.

The present invention has several advantages. First, the ability to steer the line of carts 100 (as the line 100 is being moved forward) is greatly facilitated by the cart mover 10 maintaining the wheels of carts at the rear end 104 of the line of carts 100 off the ground. This is particularly true when obstructions (e.g., snow, ice, garbage) cover the ground surface 98 over which the carts 106 are moved. Second, not only does the cart mover 10 lift the rear end 104 of the line of carts 100 off the ground to facilitate maneuvering the line of carts 100, the cart mover 10 provides power to push the line 100 so that a single operator can easily maneuver the line of carts 100 by manipulating handle 22 and handle controls 24 of drive mechanism 12 with much less chance of injury (e.g., muscle strain, etc.) than with purely manual handling of the line of carts 100. These features can be vital under slippery conditions on the ground surface 98 by reducing the likelihood of the employee slipping and falling while pushing and steering the line of carts 100 over obstructions (e.g., snow, ice) which complicate maneuvering and pushing the line of carts 100.

Although the present invention has been described with reference to preferred embodiments, workers skilled in the art will recognize that changes may be made in form and detail without departing from the spirit and scope of the invention.

What is claimed is:

1. A grocery cart mover for moving a line of grocery carts releasably engaged in series comprising:

a drive mechanism;

a cart engaging mechanism for engaging the line of grocery carts operably connected to the drive mechanism and being configured and arranged so that upon activation of the drive mechanism, the engaging mechanism lifts an end of the line of carts off the ground and moves the line of carts horizontally in a selected direction; and wherein the drive mechanism is pivotally connected to the cart engaging mechanism to facilitate steering of the cart engaging mechanism and the line of carts.

2. The grocery cart mover of claim 1 wherein the drive mechanism is spaced from the cart engaging mechanism at a distance sufficient to permit the drive mechanism to be oriented up at an angle of 90° relative to the cart engager and the line of carts.

3. The grocery cart mover of claim 1 and further including:

a harnessing mechanism releasably attachable to the cart engaging mechanism and the line of carts for securing the line of carts against the cart engaging mechanism.

4. The grocery cart mover of claim 3 wherein the harnessing mechanism further comprises:

an elongate member adapted for placement on a second end of the line of carts;

a flexible line having a length sufficient to encompass the line of carts and being cooperable with the elongate member so that when the elongate member is releasably attached to the second end of the line of carts, the elongate member is fastenable to the cart engaging mechanism thereby securing the line of carts to the cart engaging mechansim.

5. The grocery cart mover of claim 4 and further comprising:

a retractable spool fixed to the cart engaging mechanism and having the line wound thereon, the spool being adapted to permit the line to extend from the spool alongside the line of carts so that the line encompasses the line of carts and the elongate member is positionable at the second end of the line of carts.

6. The grocery cart mover of claim 1 wherein the drive mechanism further comprises:

a frame;

a motor carried on the frame;

a gear box connected to the motor;

a pair of wheels rotatably connected to the frame and engaged by the gear box for causing rotation of the wheels; and a handle for steering the drive mechanism and including a throttle for controlling the motor.

7. The grocery cart mover of claim 6 wherein the wheels include tires having a material suitable for gripping on slippery surfaces.

8. The grocery cart mover of claim 6 and further comprising a power supply for supplying power to the motor and for providing weight to the drive mechanism sufficient to facilitate gripping of the wheels on slippery surfaces.

9. A grocery cart mover for moving a line of grocery carts releasably engaged in series comprising:

a drive mechanism; and a cart engager connected to the drive mechanism for engaging the line of grocery carts including:

a first generally vertical portion and a second generally horizontal portion wherein the vertical portion forms an acute angle relative to the horizontal portion so that the first vertical portion is inclined toward an end of the line of carts and includes a mechanism for releasably supporting the end of the line of grocery carts to lift the end of the line of carts vertically off the ground and to move the line of carts horizontally including a fork formed at an upper end of the vertical portion of the cart engager.

10. The grocery cart mover of claim 8 wherein the drive mechanism is pivotally connected to the cart engager to facilitate steering of the cart engager and the line of carts.

11. The grocery cart mover of claim 8 wherein the horizontal portion of the cart engager has a size and shape configured to releasably engage a grocery cart.

12. The grocery cart mover of claim 8 wherein the horizontal portion further comprises a central frame portion and a pair of side arms slidably connected to the central frame portion on opposite sides of the central frame portion, wherein the side arms can be selectively positioned and fixed relative to the central frame to facilitate releasable engagement between the cart engager and a grocery cart.

13. The grocery cart mover of claim 12 wherein the pair of side arms of the horizontal portion are inclined upwardly relative to a horizontal plane to facilitate engaging the end of the line of carts.

14. The grocery cart mover of claim 12 wherein each side arm includes a wheel rotatably mounted on the side arm and positioned to support the cart engager on the ground to facilitate maneuvering of the cart mover in cooperation with the drive mechanism.

15. A grocery cart mover for moving a line of grocery carts releasably engaged in series comprising:
  a cart engager for engaging an end of the line of grocery carts, the engager having a generally vertical portion to lift the end of the line of carts off the ground and move the line of carts horizontally; and
  a drive mechanism pivotally connected to the cart engager to facilitate steering of the cart engager and so that upon activation, the vertical portion lifts the end of the line of carts.

16. The grocery cart mover of claim 15 wherein the cart engager further comprises:
  a generally horizontal portion that forms an acute angle relative to the vertical portion such that the generally vertical portion inclines toward the end of the line of carts and wherein the horizontal portion facilitates moving the line of carts horizontally.

17. A grocery cart mover for moving a line of grocery carts releasably engaged in series, each of the grocery carts having an end with an upper handle and a pair of lower wheels, the mover comprising:
  a drive mechanism; and
  a cart engager connected to the drive mechanism for engaging a cart at the end of the line of grocery carts including:
    a first generally vertical portion and a second generally horizontal portion wherein the vertical portion forms an acute angle relative to the horizontal portion and the first vertical portion is inclined toward an end of the line of carts and includes a mechanism for releasably supporting the upper handle of the end of the cart to lift an end of the line of carts off the ground and includes a mechanism for supporting the wheels of the cart to push the line of carts horizontally.

18. A grocery cart mover for moving a line of grocery carts comprising:
  a drive mechanism; and
  a cart engager connected to the drive mechanism for engaging a grocery cart, the engager having a generally vertical portion and a generally horizontal portion being configured and arranged so that upon activation of the drive mechanism the engager lifts an end of the line of carts off the ground and moves the line of carts horizontally,
  wherein the cart engager is pivotally connected to the drive mechanism to facilitate steering of the cart engager and the line of carts.

19. A method of moving a line of grocery carts releasably interconnected in series comprising:
  providing a line of grocery carts releasably interconnected in series;
  manipulating an engaging mechanism to engage a first end of the line of grocery carts;
  activating a drive mechanism pivotally connected to the engaging mechanism to push the line of carts in a generally horizontal plane wherein the configuration of the engaging mechanism causes the first end of the line of grocery carts to lift off the ground and push the line of carts horizontally;
  selectively steering the line of carts by pivoting the drive mechanism relative to the engaging mechanism so that the drive mechanism articulates relative to the engaging mechanism.

20. The method of claim 19 wherein after the manipulating step, the method further comprises:
  fastening the line of carts to the engaging mechanism.

* * * * *